United States Patent
Zollenkopf et al.

(10) Patent No.: US 10,421,522 B2
(45) Date of Patent: Sep. 24, 2019

(54) COVER DEVICE AND THRUSTER

(71) Applicant: SKF Marine GmbH, Hamburg (DE)

(72) Inventors: Michael Zollenkopf, Hamburg (DE);
Frank Albrecht, Stadtoldendorf (DE);
Ulrich Albrecht, Stadtoldendorf (DE);
Kai Danneberg, Hamburg (DE); Uwe Leitloff, Wennigsen (DE); Thomas Siebrecht, Elmshorn (DE); Holger Spardel, Hamburg (DE)

(73) Assignee: SKF Marine GmbH, Hamburg (DE)

( * ) Notice: Subject to any disclaimer, the term of this patent is extended or adjusted under 35 U.S.C. 154(b) by 0 days.

(21) Appl. No.: 15/772,269

(22) PCT Filed: Oct. 18, 2016

(86) PCT No.: PCT/EP2016/074959
§ 371 (c)(1),
(2) Date: Apr. 30, 2018

(87) PCT Pub. No.: WO2017/076637
PCT Pub. Date: May 11, 2017

(65) Prior Publication Data
US 2018/0312223 A1 Nov. 1, 2018

(30) Foreign Application Priority Data
Nov. 2, 2015 (DE) .................... 10 2015 221 427

(51) Int. Cl.
*B63B 1/36* (2006.01)
*B63B 13/02* (2006.01)
*B63H 25/46* (2006.01)

(52) U.S. Cl.
CPC ............ *B63B 1/36* (2013.01); *B63B 13/02* (2013.01); *B63H 25/46* (2013.01); *B63H 2025/465* (2013.01); *Y02T 70/121* (2013.01)

(58) Field of Classification Search
CPC .......... B63B 1/36; B63B 13/02; B63H 25/46; B63H 2025/465; Y02T 70/121
See application file for complete search history.

(56) References Cited

U.S. PATENT DOCUMENTS 3,151,663 A * 10/1964 Bohner ................ B60F 3/0038
114/202
4,033,247 A * 7/1977 Murphy .................... B64C 1/18
137/513.3

(Continued)

FOREIGN PATENT DOCUMENTS

| DE | 1182550 A | 11/1964 | |
|---|---|---|---|
| DE | 1182550 B | * 11/1964 | ............ B63H 25/46 |

(Continued)

*Primary Examiner* — S. Joseph Morano
*Assistant Examiner* — Jovon E Hayes
(74) *Attorney, Agent, or Firm* — Bryan Peckjian; SKF USA Inc. Patent Dept.

(57) ABSTRACT

The invention relates to a cover device for at least sectional closing of an underwater opening in a hull of a watercraft, in particular an opening of a transverse channel of a thruster. According to the invention the cover device includes at least one variable-volume hollow chamber lip including at least one buoyancy body, and the at least one hollow chamber lip is shiftable into an expansion state or into a shrinkage state by supplying or removing a fluid, in particular air. As a result of the variable-volume or inflatable cover device a more reliable and simultaneously lower-maintenance operation of the cover device is given. In addition, the invention has a thruster, in particular a bow or stern-thruster, as subject matter.

13 Claims, 3 Drawing Sheets

(56) References Cited

U.S. PATENT DOCUMENTS

| | | | | | |
|---|---|---|---|---|---|
| 4,568,291 | A | * | 2/1986 | Nelson | B63H 5/18 |
| | | | | | 114/246 |
| 4,793,658 | A | * | 12/1988 | Brown | B60B 7/10 |
| | | | | | 301/108.1 |
| 5,067,765 | A | * | 11/1991 | Frye | B60J 1/2011 |
| | | | | | 296/97.4 |
| 9,623,942 | B2 | * | 4/2017 | Schiaffino | B63B 17/0018 |
| 2002/0178990 | A1 | * | 12/2002 | McBride | B63G 8/16 |
| | | | | | 114/312 |
| 2018/0312223 | A1 | * | 11/2018 | Zollenkopf | B63B 1/36 |

FOREIGN PATENT DOCUMENTS

| | | | | | |
|---|---|---|---|---|---|
| DE | 2051785 | A | | 4/1972 | |
| DE | 2051785 | A1 | * | 4/1972 | B63H 25/42 |
| DE | 19618761 | A1 | * | 11/1997 | B63B 43/16 |
| DE | 19618761 | A1 | | 11/1997 | |
| FR | 2213188 | A1 | * | 8/1974 | B63B 43/16 |
| FR | 2213188 | A1 | | 8/1974 | |
| JP | H0550989 | A | | 3/1993 | |
| JP | H09295571 | A | | 11/1997 | |
| JP | 2003276675 | A | | 10/2003 | |
| JP | 2003276675 | A | * | 10/2003 | B63B 1/36 |
| KR | 20100031009 | A | | 3/2010 | |
| KR | 2012006375 | A | | 6/2012 | |
| KR | 101228644 | B1 | * | 1/2013 | B63B 1/36 |
| KR | 101228644 | B1 | | 1/2013 | |
| KR | 20130000144 | A | | 1/2013 | |
| KR | 101259629 | B1 | * | 4/2013 | B63B 1/36 |
| KR | 101259629 | B1 | | 4/2013 | |
| KR | 101334832 | B1 | * | 12/2013 | B63H 25/46 |
| KR | 101334832 | B1 | | 12/2013 | |

\* cited by examiner

COVER DEVICE AND THRUSTER

CROSS REFERENCE

This is a United States National Stage Application claiming the benefit of International Application Number PCT/EP2016/074959 filed on Oct. 18, 2016, which claims the benefit of Patent Application 102015221427.3 filed on Nov. 2, 2015, both of which are incorporated herein by reference in their entireties.

FIELD OF THE INVENTION

The invention relates to a cover device for at least sectional closing of an opening lying under water, which opening is in a hull of a watercraft, in particular an opening of a transverse channel of a thruster. In addition, the invention has a thruster, in particular a bow- or stern-thruster, as subject matter.

BACKGROUND OF THE INVENTION

Modern passenger or cargo ships have in general a variety of openings lying under water. Such openings serve, for example, for the suction of cooling water from the fairway water and for the reinjection of the heated cooling water into the fairway water of the ship. Furthermore, to improve the maneuverability of a ship, for example, a thruster can be provided in the bow- and/or stern-region. With favorable flow- and weather-conditions thrusters can make unnecessary a cost-intensive use of tugboats in docking maneuvers, in particular for the transverse movement of the ship. However, such thrusters require a transverse channel completely penetrating the ship hull below the waterline in the bow- or stern-region, whereby two extensive opposing openings arise.

Due to the end-side openings of the transverse channel, turbulences arise in the water that lead to an increase of the flow resistance of the hull in normal driving operation of a ship. This in turn results in a now unacceptable increase in fuel consumption. A high significance is associated with this fact due to the often high travel speeds of cargo and passenger ships, which can fall in a range of 20 knots.

In order to reduce the flow resistance of a ship hull in normal driving operation, circular butterfly valves are known, for example, for the closing of the openings of a transverse channel of a thruster. Due to the rotating of the butterfly valves respectively disposed in the region of one of the two opposing openings of the transverse channel, in normal driving operation of the ship the openings can close nearly flush with the outer hull skin. In the maneuvering operation of the ship the butterfly valves are opened by rotating about their longitudinal center axis by 90°. In the fully opened state the butterfly valves are oriented parallel to the longitudinal direction of the transverse channel, so that a water flow generated by a drive propeller of the thruster can pass the butterfly valves largely unhindered due to their low material thickness in relation to the diameter of the transverse channel.

However, many years of experience with such butterfly valves have shown that in particular their bearing points generally disposed diametrically in the opening are subject to a high mechanical load due to the propeller slipstream of the thruster, external flow forces, and the impact of waves. Furthermore, the bearing points of the butterfly valves are permanently exposed to the corrosive fairway water. In themselves or in combination with one another, in the extreme case all influencing factors can lead to the complete failure of such a butterfly valve.

SUMMARY OF THE INVENTION

An object of the invention is therefore to provide a low-maintenance and reliable cover device for an opening lying under water, which opening is in a hull of a watercraft. In addition, it is an object of the invention to provide a low-maintenance-as-possible thruster for a watercraft.

This object is initially achieved by a cover device including the features of patent claim 1.

Since the cover device includes at least one variable-volume hollow chamber lip including at least one buoyancy body, and the at least one hollow chamber lip is shiftable into an expansion state or into a shrinkage state by supplying or removing a fluid, in particular air, a largely wear-free and low-maintenance design of the cover devices is given that in particular manages without bearing- or hinge-points. Consequently a failure-free operation is given in corrosive media, in particular in seawater. In the expansion state the high pressure of the introduced fluid or medium ensures a sufficient dimensional stability of the hollow chamber lip and thus a reliable closure of the opening in the hull of the ship in normal driving operation. The cover device is preferably driven with compressed air or with air that is under a higher pressure than normal atmospheric pressure (1013 hPa) as fluid, which is generally always kept available on board ships. Other fluids, such as, for example, water, seawater, or oil can be used as fluid. In the expansion state—in the case of an opening with a circular cross-sectional geometry—the hollow chamber lip has an approximately half-oval or tongue-type shaping.

In accordance with an advantageous further development it is provided that the hollow chamber lip includes at least one flexible and high-tensile-strength shaping element. With reaching of the maximum expansion state the hollow chamber lip can thereby be conferred a shape, defined and generally deviating from a balloon-shaped geometry, for example, mat-shaped.

The hollow chamber lip is preferably constructed with a fluid-tight and flexible surface structure. This makes possible a substantial design change of the hollow chamber lip by the supplying or the removal of the fluid. The surface structure can be, for example, a flexible and possibly elastic film or another fluid-tight, possibly rubberized textile material whose material thickness is small in relation to its surface extension.

According to one further development, in the expansion state of the hollow chamber lip the opening is essentially completely closed, and in the shrinkage state essentially completely unblocked. In the normal driving operation of a watercraft, in particular of a ship, the opening is thereby practically completely closed, so that an increase of the flow resistance of the hull in water is precluded to the largest possible extent.

At least one bistable spring element is preferably disposed at least sectionally in the region of a free end of the hollow chamber lip. Due to the elastic and yet bistable element the change between the shrinkage state and the expansion state of the hollow chamber lip is supported. In the expansion state the free end of the hollow chamber lip extends essentially along a lower opening section facing the sea floor, and in the shrinkage state in the ideal case ends flush with an upper opening section directed away therefrom. The bistable spring element can be formed, for example, using rubber, using plastic, using a metal, in particular using spring steel, or a combination of the materials mentioned.

A change between the expansion state and the shrinkage state of the hollow chamber lip and vice versa is preferably effected rapidly due to the bistable spring element. As a result, intermediate states wherein the opening is only partially closed or unblocked by the cover device are passed through quickly. A suction of parts of the surface structure of the hollow chamber lip by the propeller of the thruster is thus reliably avoided.

In one further development an abutment element having a small flow resistance, in particular a grate, is disposed in the opening at least in sections. In the expansion state a lateral supporting, acting at least on one side, of the hollow chamber lip in the direction of extension of the transverse channel is thereby ensured. This abutment element can be realized, for example, using grates, perforated metal plates, etc.

In the case of one preferred embodiment, in the shrinkage state the at least one hollow chamber lip is completely receivable in a storage space, and in the expansion state the free end of the hollow chamber lip is receivable at least in sections in a recess in an interference-fit manner. It is ensured by the storage space that in the shrinkage state the hollow chamber lip withdraws completely from the cross-section of the opening and no relevant increase of the flow resistance occurs in operation of the thruster. Due to the recess an additional positional securing of the free end of the hollow chamber lip is ensured in its expansion state, which leads to a further improvement of the sealing functionality of the cover device. The preferably rectangular recess is generally provided in the region of a low point of the lower opening section of the opening. In the context of the description the term "low point" is understood to mean a fictitious point lying closest to the sea floor or a "lower" vertex of the semicircular cross-sectional geometry of the lower opening of the thruster.

The at least one buoyancy body is preferably disposed in the region of the free end of the hollow chamber lip and has a lower density than water. Due to the buoyancy force of the buoyancy body directed away from the sea floor or sea bed or acting against the force of gravity, the transition between the expansion state and the shrinkage state of the hollow chamber lip is supported. The buoyancy body can have, for example, the shape of a torus section. Furthermore, a plurality of buoyancy bodies can be provided disposed distributed over the free end of the hollow chamber lip, preferably spaced uniformly with respect to one another.

In addition, the above-mentioned object is achieved by a thruster, in particular a bow- or stern-thruster, in accordance with patent claim 10.

Since the thruster for a watercraft includes at least one cover device according to one of patent claims 1 to 9, a thruster for a watercraft can be provided whose transverse channel including as a rule two openings can be closable and unblockable again in a reliable and low-maintenance manner. In normal driving operation, to minimize the flow resistance the openings can thereby be completely closed, and in maneuvering operations with active thrusters completely unblocked. The thruster can be embodied, for example, as a bow- or stern-thruster. The inventive cover devices thereby manage without mechanical hinge- and bearing-points prone to failure that frequently tend to fail. Furthermore no mechanical drive components prone to failure, such as, for example, drives or motors, are necessary for operation of the cover device.

BRIEF DESCRIPTION OF THE FIGURES

In the drawings identical constructive elements have identical reference numbers.

Figure 1:
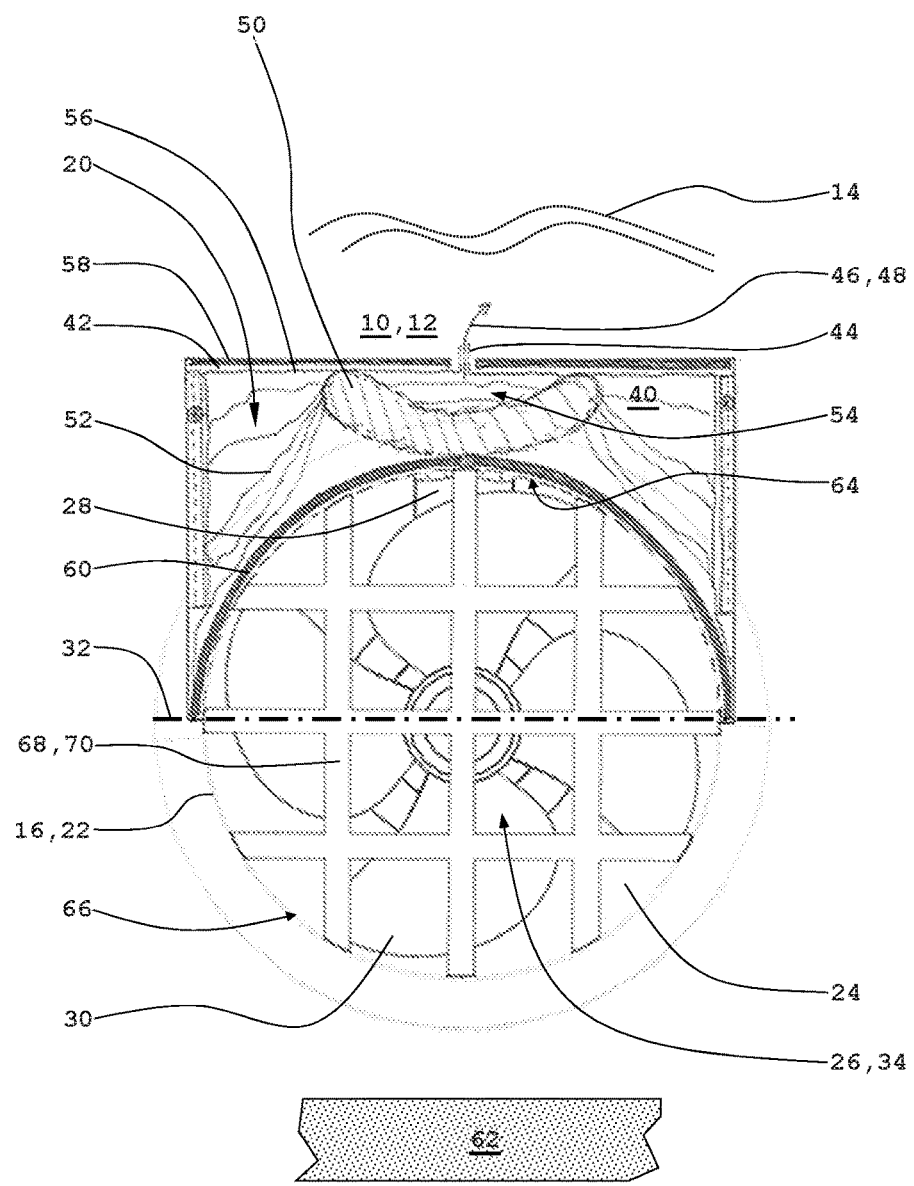
FIG. 1 shows a plan view of an opening lying under water of a thruster in a hull of a watercraft including its cover device in a complete shrinkage state.

An underwater opening 16 of a thruster in a hull 10 of a watercraft 12 with a cover device 20 is shown in a complete shrinkage state in the illustration presented in FIG. 1.

DETAILED DESCRIPTION OF THE INVENTION

In the hull 10 of the watercraft 12, formed exemplarily here as a ship, the opening 16 lying under water 14 has a circular cross-sectional geometry, which opening 16 is temporarily closable using the inventive cover device 20. The opening 16 is only exemplarily designed here as a starboard- or port-side opening 22 of a transverse channel 24 of a thruster 26, which transverse channel 24 fully penetrates the hull 10. The thruster 26 includes a drive unit 28 for rotationally driving a propeller 30 in order to generate a strong water flow, necessary for easier maneuvering, in the transverse channel 24 extending transverse to a longitudinal axis 32 of the hull 10. Here the thruster 26 can be configured, for example, as a bow- or stern-thruster 34. In principle using the cover device 20 any openings lying under water in a hull of a watercraft can be closed.

The cover device 20 comprises, among other things, a variable-volume, approximately sack-shaped hollow chamber lip 40, which in the complete "shrinkage state" depicted here is completely received in a storage space 42 in the region of the hull 10 so that the opening 22 is completely unblocked, and with the thruster 26 activated an impairment of the water flow in the transverse channel 24 is practically precluded.

Via a tubular connection 44 a fluid 46, which is preferably compressed air 48 or another gas, can be supplied to the hollow chamber lip 40 or discharged or sucked away therefrom. By a sufficient supply of compressed air 48 the hollow chamber lip 40 is shifted into the so-called "expansion state," i.e., a completely expanded state (see in particular FIG. 2), while the hollow chamber lip 40 is shiftable by the complete-as-possible sucking-out of the compressed air 48 into the so-called "shrinkage state" shown here.

In order to support the transition from the "expansion state" into the "shrinkage state," a buoyancy body 50 is integrated into the hollow chamber lip 40, the density of which buoyancy body is significantly lower than that of water. The hollow chamber lip 40 is constructed with a fluid-tight, foldable, as well as flexible-as-possible and possibly elastic surface structure 52. The buoyancy body 50 is exemplarily disposed here in the region of a free end 54 of the hollow chamber lip 40 and disposed outside thereof. A fixed end 56 of the hollow chamber lip 40, which fixed end 56 is directed away from the free end 54, is attached in the region of a top-side cover 58 of the storage space 42. The surface structure 52 of the hollow chamber lip 40 can be, for example, an optionally fiber-reinforced, high-strength plastic film or an elastomer film.

Furthermore, the hollow chamber lip includes a bistable spring element 60, e.g., a thick-walled plastic mat that in the "shrinkage state" depicted here essentially extends along an upper opening section 64 facing away from the sea floor 62 or the sea bed. The one bistable spring element 60 having essentially semicircular cross-sectional geometry serves to allow each change between the "shrinkage state" and the "expansion state" of the hollow chamber lip 40 to be effected without transition or as quickly as possible in the manner of the "clicker principle," in order to avoid intermediate states. Circumference-side a lower opening section 66 directed toward the sea floor 62 connects to the upper opening section 64. Here both the upper and the lower opening section 64, 66 respectively have an approximately semicylindrical shaping, which together form an approximately circular cross-sectional geometry of the transverse channel 24.

In addition an abutment element 70 exemplarily designed as a grate 68 is provided here that serves as a one-sided lateral guiding for the hollow chamber lip 40 in its fully expanded state or in the expansion state. Alternatively a further grate not depicted here can be provided that extends spaced parallel to the grate 68, so that in the expansion state of the hollow chamber lip 40 (see in particular FIG. 2)—which in normal driving operation of the watercraft or of the ship is usually set for closing of the opening 22 of the transverse channel 24—a particularly reliable two-sided guiding of the hollow chamber lip 40 between both grates is ensured.

Figure 2:
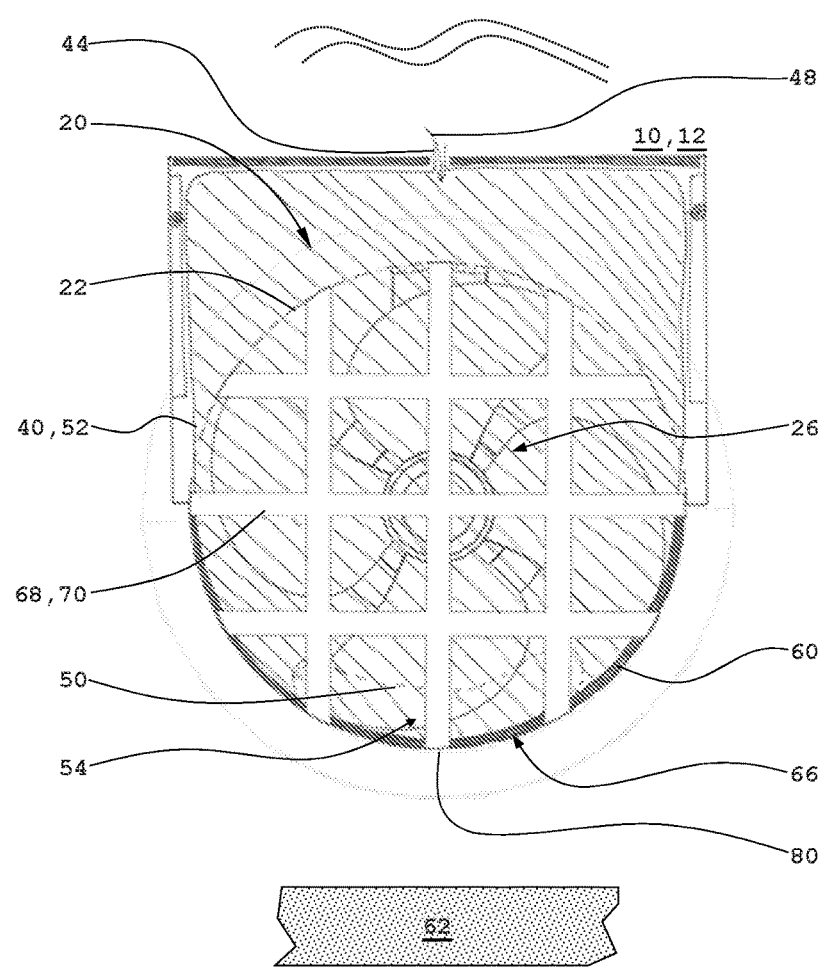
FIG. 2 shows a schematic plan view of the cover device of FIG. 1 in a fully expanded state.

FIG. 2 shows a schematic plan view of the cover device of FIG. 1 in the full "expansion state."

In the "expansion state" the free end 54 of the hollow chamber lip 40 or the bistable spring element 60 extends in the region of the lower opening section 66, whereby the opening 22 of the thruster 26 is practically completely closed, and in normal driving operation no significant increase of the flow resistance of the hull 10 of the watercraft 12 results. In the "expansion state" the buoyancy body 50 is located in the region of a low point 80 of the lower opening section 66.

Here the tongue-shaped hollow chamber lip 40 is supported on one side on the grate 68. The change from the "shrinkage state" (see in particular FIG. 1) into the "expansion state" shown here of the hollow chamber lip 40 is effected by the supplying of compressed air 48 via the connection 44 into the sack-type fabric 52 of the hollow chamber lip 40, which consequently inflates until reaching the full "expansion state."

With the transition from the "shrinkage state" into the "expansion state" the bistable spring element 60 springs abruptly or in a transitionless manner into the position shown here, which is mirror-symmetric with respect to the extension of the spring element 60 in the shrinkage state and in which to ensure an optimal sealing effect, in the ideal case the spring element 60 or the free, semicircular end 54 of the hollow chamber lip 40 abuts completely in the region of the lower opening section 66 of the opening 22 of the thruster 26.

Figure 3:
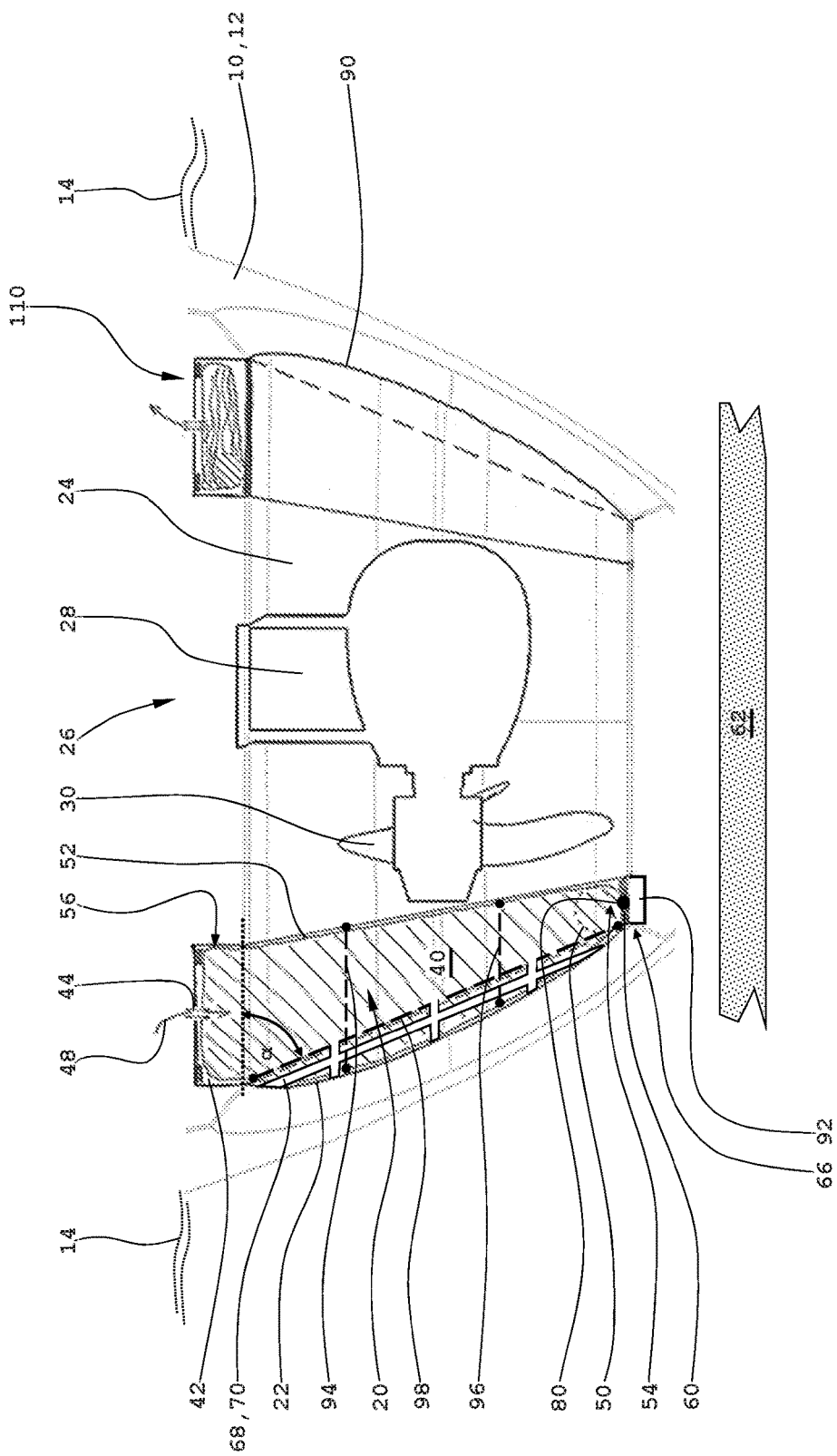
FIG. 3 shows a longitudinal section through the thruster including the cover device of FIGS. 1 and 2 and a further cover device.

FIG. 3 shows a longitudinal section through the thruster including the cover device of FIGS. 1, 2 and a further cover device.

The thruster 26 comprises the transverse channel 24 fully penetrating the hull 10 of the watercraft 12 under water 14. The approximately hollow-cylindrical transverse channel 24 includes the opening 22 as well as a further opening 90 incorporated opposite thereto in the hull 10. The sea floor 62 lies spaced below the hull 10 of the watercraft 12. The propeller 30 including its drive unit 28 disposed at least partially outside the transverse channel 24 is located within the transverse channel 24 of the thruster 26.

The opening 22 of the transverse channel 24 is fully closed or covered by the cover device 20 found here in the "expansion state." Using the compressed air 48 constantly guided in or out via the connection 44 a permanent maintaining of the "expansion state" of the hollow chamber lip 40 is possible in normal driving operation of the watercraft 12.

The bistable spring element 60 and the buoyancy body 50 are located in the region of the free end 54 of the hollow chamber lip 40. Due to the abutment element 70 indicated in perspective here and realized here as grate 68 the hollow chamber lip 40 experience a positional securing, so that it always ends flush with the hull 10 of the watercraft 12, and in normal driving operation a reliable closing of the opening 22 is ensured.

For further optimization of the positional securing of the hollow chamber lip 40, inside the opening 22 in the lower opening section 66 in the region of the low point 80 at least one, for example, rectangular recess 92, or a "trench" or a "trough" extending parallel to a ship longitudinal axis is provided, into which the free end 54 of the hollow chamber lip 40 is at least partially receivable or introducible thereinto by sections in an interference-fit manner in the "expansion state."

Within the hollow chamber lip 40 three, for example, band- or strip-type shaping element 94, 96, 98 are provided, here merely exemplarily. These shaping elements 94, 96, 98 can support tensile forces, but no significant compressive forces, and serve to confer to the hollow chamber lip 40 in the expansion state a well-defined, e.g., mat- or mattress-type shape. The shaping elements 94, 96 preferably extend approximately parallel to the transverse channel 24, while the individual shaping element 98 extends at an angle α inclined here only approximately 85° with respect to the transverse channel 24. The shaping element 98 can be disposed, for example, between the bistable spring element 60 and the fixed end 56 of the hollow chamber lip 40, which fixed end 56 is fixed top-side in the storage space 42. The shaping elements 94, 96, and 98 can be constructed, for example, using textile bands having a high tensile strength. Alternatively the shaping elements 94, 96, and 98 can be comprised of the same fabric 52 as the hollow chamber lip 40 and be designed strip-shaped here.

The second opening 90 of the transverse channel 24 of the thruster 26 is closable using a further cover device 110. The cover device 110 for the opening 90 is embodied mirror-symmetric with respect to the cover device 20, but in contrast to the cover device 20 is located here in the "shrinkage state." Otherwise the constructive design and the functioning of the cover device 110 corresponds to that of the cover device 20 so that at this point—in order to avoid repetitions of content—reference is made to the explanations of the cover device 20 (see in particular FIGS. 1, 2). The hollow comb lip 40 of the cover device 20 need not necessarily be designed tapered downward, i.e. toward the lower opening section 66. The same applies for the other cover device 110.

Deviating from the possibility, only exemplarily presented in FIGS. 1 to 3, of closing the two-sided openings of a transverse channel of a thruster using one each of the inventive cover devices, using the inventive cover device other openings lying below the waterline of a ship can be designed closable using the inventive cover device.

Due to the constructively simple design of the variable-volume or inflatable hollow chamber lip—which manages without mechanically movable components in the narrower sense, in particular bearing points, hinge points, motors, and drives—a longer-lifespan, more reliable, and lower maintenance operation of the cover device is ensured.

The invention relates to a cover device for at least sectional closing of an opening lying under water in a hull of a watercraft, in particular an opening of a transverse channel of a thruster. According to the invention the cover device includes at least one variable-volume hollow chamber lip including at least one buoyancy body, and the at least one hollow chamber lip is shiftable into an expansion state or into a shrinkage state by the supplying or the removal of a fluid, in particular air. As a result of the variable-volume or inflatable cover device a more reliable and simultaneously lower-maintenance operation of the cover device is given. In addition, the invention has a thruster, in particular a bow- or stern-thruster, as subject matter.

REFERENCE NUMBER LIST

10 Hull
12 Watercraft
14 Water
16 Opening (general)
20 Cover device
22 Opening (transverse channel)
24 Transverse channel (thruster)
26 Thruster
28 Drive unit
30 Propeller
32 Longitudinal axis (hull)
34 Bow- or stern-thruster
40 Hollow chamber lip
42 Storage space
44 Connection
46 Fluid
48 Compressed air (air)
50 Buoyancy body
52 Surface structure
54 Free end
56 Fixed end
58 Cover (storage space)
60 Bistable spring element
62 Sea floor
64 Upper opening section
66 Lower opening section
68 Grate
70 Abutment element
80 Low point
90 Opening (transverse channel)
92 Recess
94 Shaping element
96 Shaping element
98 Shaping element
110 Cover device

The invention claimed is:

1. A cover device for at least partially closing an opening in the hull of a watercraft, the opening in the hull lying under water, the opening in the hull being an opening of a transverse channel of a thruster,
the cover device comprising at least one variable-volume hollow chamber lip including at least one buoyancy body, and
wherein the at least one variable-volume hollow chamber lip is shift-able into one of:
(a) an expansion state by the supplying of a fluid, or
(b) into a shrinkage state by the removal of the fluid.

2. The cover device according to claim 1, the variable-volume hollow chamber lip further comprising at least one flexible and a tensile-strength shaping element.

3. The cover device according to claim 1, wherein the variable-volume hollow chamber lip is constructed with a fluid-tight and flexible fabric.

4. The cover device according to claim 1, wherein, in the expansion state of the variable-volume hollow chamber lip, the opening is completely closed, and in the shrinkage state of the variable-volume hollow chamber lip, the opening is completely unblocked.

5. The cover device according to claim 1, wherein, in the region of a free end of the variable-volume hollow chamber lip, at least one bistable spring element is disposed at least in sections.

6. The cover device according to claim 5, wherein a change between the expansion state of the variable-volume hollow chamber lip is effected rapidly due to the bistable spring element and wherein the shrinkage state of the variable-volume hollow chamber lip is also effected rapidly due to the bistable spring element.

7. The cover device according to claim 1, wherein, in the opening, an abutment element having a small flow resistance is disposed at least sectionally.

8. The cover according to claim 1, wherein in the shrinkage state, the at least one variable-volume hollow chamber lip is completely receivable in a storage space, and in the expansion state the free end of the variable-volume hollow chamber lip is receivable at least sectionally in a recess in an interference-fit manner.

9. The cover device according to claim 1, wherein the at least one buoyancy body is disposed in the region of the free end of the variable-volume hollow chamber lip and has a lower density than water.

10. The cover device according to claim 1 installed in at least one opening of a transverse channel of the thruster, wherein the thruster is a bow thruster.

11. The cover device according to claim 1 installed in at least one opening of a transverse channel of the thruster, wherein the thruster is a stern thruster.

12. The cover device according to claim 1, wherein the fluid is air.

13. The cover device according to claim 7, wherein the abutment element is a grate.

* * * * *